United States Patent [19]
Kikuchi et al.

[11] Patent Number: 5,432,805
[45] Date of Patent: Jul. 11, 1995

[54] METHOD OF DETECTING TRANSMISSION ERROR IN DISASTER PREVENTION SUPERVISORY SYSTEM

[75] Inventors: Masamichi Kikuchi, Ayase; Akio Adachi, Tokyo, both of Japan

[73] Assignee: Hochiki Kabushiki Kaisha, Tokyo, Japan

[21] Appl. No.: 198,941

[22] Filed: Feb. 18, 1994

Related U.S. Application Data

[63] Continuation-in-part of Ser. No. 859,097, Mar. 27, 1992.

[51] Int. Cl.⁶ ............................................. G06R 11/00
[52] U.S. Cl. ...................................... 371/53; 371/11.2; 371/34
[58] Field of Search .................. 371/53, 11.2, 16.5, 371/20.1, 20.4, 32, 34; 395/575

[56] References Cited

U.S. PATENT DOCUMENTS 5,255,208 10/1993 Thakore et al. ............... 371/16.5
5,283,571 10/1994 Yang et al. .................... 371/11.2

Primary Examiner—Vincent P. Canney
Attorney, Agent, or Firm—Max Fogiel

[57] ABSTRACT

During data transmission between a receiver and each of terminal devices in a disaster prevention supervisory system, the receiver sends calling data including address data for specifying a specific terminal device to the side of terminal devices in a transmission error detection mode. The receiver also causes the terminal device specified by the address data to return error detection response data including self-address data and check data for a current level previously defined. When the current level of the check data in the error detection response data received by the receiver is higher than the level previously defined due to the response of a plurality of terminal devices, it is decided that an abnormality is present in the terminal device of the address specified by the calling data. The arrangement provides a transmission error detecting method for securely detecting error in data transmission between the receiver and each of the terminal devices and enables improvement in the reliability of data transmission.

6 Claims, 16 Drawing Sheets

METHOD OF DETECTING TRANSMISSION ERROR IN DISASTER PREVENTION SUPERVISORY SYSTEM

BACKGROUND OF THE INVENTION

The present application is a continuation-in-part of the parent application Ser. No. 859,097, filed Mar. 27, 1992.

FIELD OF THE INVENTION

The present invention relates to data transmission between a receiver and each of a plurality of terminal devices in a disaster prevention supervisory system such as a fire supervisory system or the like, and particularly to a method of detecting transmission error.

DESCRIPTION OF THE RELATED ART

In a conventional disaster prevention supervisory system such as a fire supervisory system or the like, a transmission line is provided between the receiver installed in a central supervisory room or the like and each of a plurality of supervisory regions. Terminal devices such as a fire sensor, a gas sensor, a repeater and so on are connected to the transmission lines. The receiver successively calls the terminal devices by employing a so-called polling method and receives response data therefrom. This causes the centralized supervision of the supervisory regions.

An example of data transmission by a conventional polling method is described below with reference to the timing charts shown in FIGS. 12(A)(A) and 12(A)(B). An inherent address is first set in each of the terminal devices. As shown by points t1 to t2 in FIG. 12(A)(A), the receiver sends calling data including 1 byte each of command data, address data and checksum data. The terminal device 1 corresponding to the address data responses to this calling and returns response data including terminal state data indicating supervisory results and checksum data, as shown by points t3 to t4 in FIG. 12(A)(B). The same processing is repeated for the terminal device (i+1). In this way, the receiver successively sends calling data while changing the contents of address data so as to successively call the terminal devices and obtain the response data therefrom.

The checksum data in the calling data shown in FIG. 12(A) which is sent from the receiver is added for causing the terminal device called to detect error in the calling data and is the sum (modulo 256) of the command data and the address data. On the other hand, the checksum data in the response data shown in FIG. 12(B) and returned from each of the terminal devices is added for causing the receiver to detect error in the response data and is the modulo 256 of the terminal state data.

Another example of transmission by a conventional polling method is described below: An inherent address is previously set in each of the terminal devices. As shown by points t1 to t2 in FIG. 12(B)(C), the receiver sends calling data including 1 byte each of command data, address data and checksum data. The terminal device i corresponding to the address responds to this calling data and returns response data including terminal state data showing supervisory results, self-address data and checksum data, as shown by points t3 to t4 in FIG. 12(B)(D). The same processing is performed for the terminal device (i+1). In this way, the receiver successively sends the calling data while changing the contents of the address data so as to successively obtain supervisory information from the terminal devices in the same way as that described above.

The checksum data in the calling data shown in FIG. 12(B)(C) is the sum (modulo 256) of the command data and the address data. The checksum data in the response data shown in FIG. 12(B)(D) which is returned from each of the terminal devices is the sum (modulo 256) of the terminal state data and the self-address data.

As described above, in each of the above transmission systems, transmission processing is performed with the timing shown in the drawings while each of the receiver and the terminal devices analyzes the checksum data in the transmit data received and decides whether or not transmission error is present.

However, in such a method of detecting transmission error in a conventional disaster prevention supervisory system, when the same address is mistakenly set in a plurality of terminal devices during a work or the like, a plurality of terminal devices simultaneously respond to the calling data sent from the receiver. The same applies if, at the time of interchange of a terminal necessitated by a failure in the terminal, the terminal is changed while an incorrect address is set. Thus, the receiver cannot recognize the terminal device which returns response data, thereby producing the problem of deteriorating the reliability of the system.

Namely, each of the terminal devices contains a DIP switch or the like for setting the self-address, and, during construction of a building, a worker sets the self-address of each terminal device by adjusting the DIP switch thereof when each terminal device is installed. At this time, when the same self-address is set in a plurality of terminal devices, a problem occurs. An increase in number of terminal devices causes such a problem to easily occur and makes it very difficult to detect error.

SUMMARY OF THE INVENTION

The present invention has been achieved in consideration of the above problems of conventional systems, and it is an object of the invention to provide a method of detecting error in a disaster prevention supervisory system which permits an increase in reliability of data transmission.

In order to achieve the object, the present invention provides a transmission error detecting method for detecting error in data transmission between a receiver and each of a plurality of terminal devices in a disaster prevention supervisory system. In the present invention, a transmission error detection mode is first set. At this time, the receiver sends calling data including address data for specifying a specific terminal device to the side of the terminal devices. The receiver causes the terminal device specified by the address data to return error detection response data including the self-address and the check data for the current level which is previously defined. When the current level of the check data in the error detection response data received by the receiver is not equal to the range previously defined, it is decided that there is abnormality in the terminal device of the address specified by the calling data.

The receiver preferably comprises a return current level check circuit for comparing the current level of the check data in the error detection response data returned from a terminal device with the current level previously defined, a serial data receiving circuit for receiving usual data returned from a terminal device, a switching circuit for switching the return current level check circuit and the serial data receiving circuit so as to selectively switch a circuit for receiving the data returned from a terminal device, and a central control section for controlling the switching circuit.

Alternatively, the receiver comprises a serial receiving circuit for receiving the data returned from a terminal device, a comparator circuit for supplying to the serial receiving circuit return data only having a current value higher than a predetermined threshold value, a comparator circuit control section for controlling the comparison circuit, and a central control section for controlling the comparator circuit control section. The receiver receives the data returned from the serial receiving circuit so as to detect transmission error and abnormality, wherein the comparator circuit has two threshold values so as to supply to the serial receiving circuit only a current higher than one of the two threshold values which is set by the comparator circuit control section during usual receiving of return data and to supply to the serial receiving circuit only a current higher than the sum of the two threshold values in the transmission error detection mode.

In this transmission error detecting method, the receiver receives the error detection response data returned from one terminal device. Thus the current level of the check data in the error detection response data received on the receiver side is substantially equal to the current level of the check data returned from one terminal device. On the other hand, when a plurality of terminal devices which are set at the same address simultaneously respond to the calling data and return the error detection response data, the current level of the check data in the error detection response data received on the receiver side is a current level proportional to the number of the terminal devices which simultaneously respond to the calling data. Namely, the current level is higher than that in a normal case.

When a current level of the check data in the error detection response data received by the receiver side is higher than the current level previously defined, it is thus decided that an abnormality is present.

As described above, the present invention enables the reliable and rapid detection of an abnormality when error detection processing is performed for checking whether or not terminal devices are respectively installed at normal positions.

DESCRIPTION OF PREFERRED EMBODIMENTS OF THE INVENTION

Figure 1:
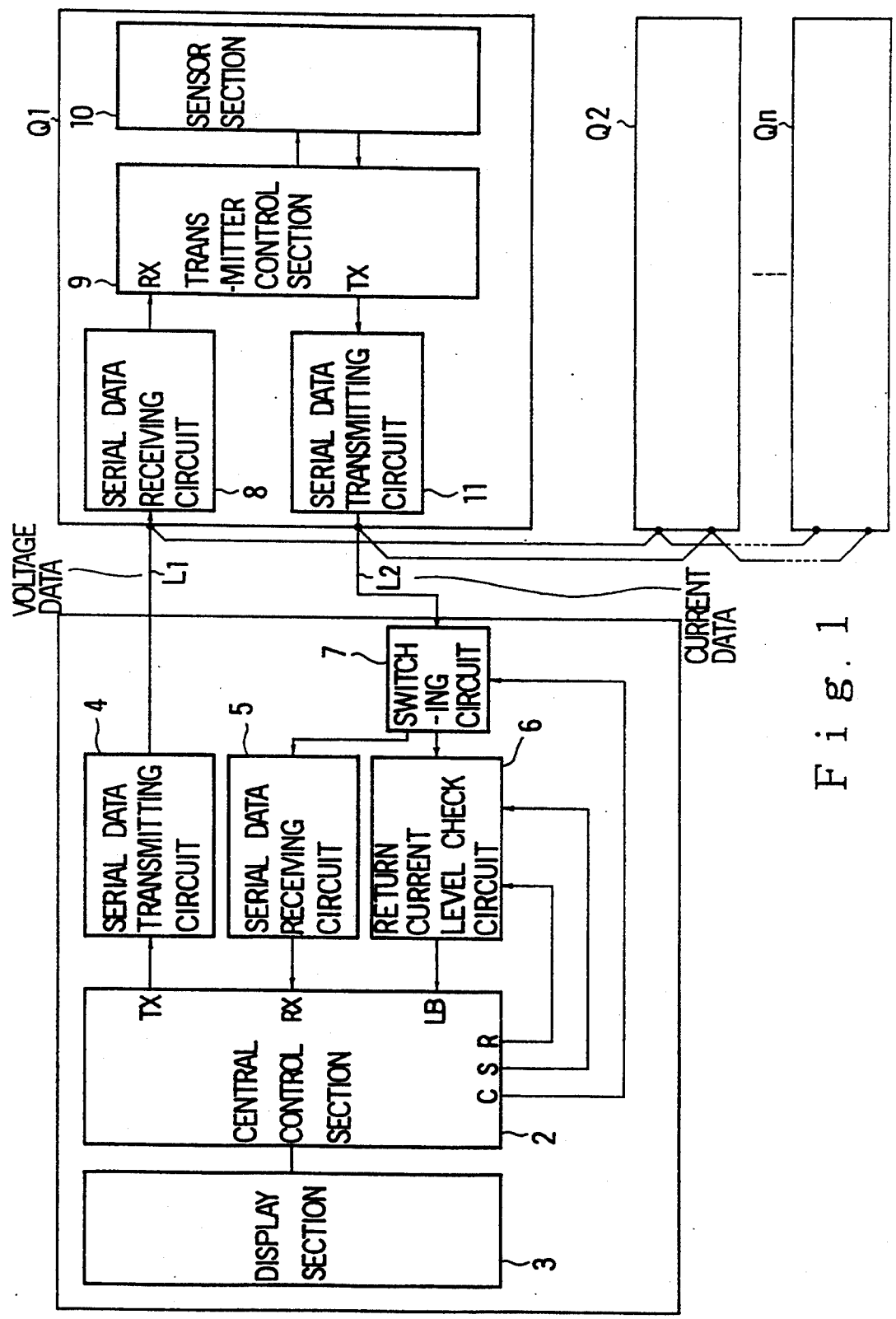
FIG. 1 is an explanatory view showing the configuration of a disaster prevention supervisory system in accordance with an embodiment of the present invention.

An embodiment of the present invention is described below with reference to the drawings:

The configuration of a disaster prevention supervisory system in this embodiment is described below with reference to FIG. 1. In FIG. 1, a receiver 1 installed in a central supervisory room or the like is connected through transmission lines L1, L2 to a plurality of terminal devices Q1 to Qn respectively installed in supervisory regions. This system employs a so-called polling method in which the receiver 1 successively sends voltage calling data through the transmission line L1. The terminal device corresponding to the calling data returns current response data through the transmission line L2.

The receiver 1 is provided with a central control section 2 containing a microprocessor for forming the calling data and analyzing the response data, a display section 3 for displaying a supervisory state and the like, a serial data transmitting circuit 4 for serially transmitting the callings data, a serial data receiving circuit 5 for receiving the response data returned from a terminal device, a return current level check circuit 6 which is operated for detecting error, and a switching circuit 7 for supplying the response data to the serial data receiving circuit 5 in the case of usual disaster prevention supervisory processing and for supplying the response data to the return current level check circuit 6 in the case of error detection processing.

On the other hand, a terminal device Q1 which is representative of the terminal devices, is provided with a serial data receiving circuit 8 for receiving the calling data transmitted through the transmission line L1, a transmitter control section 9 containing a microprocessor, a sensor section 10 having a detecting function to detect a fire, gas or the like, which is inherent to each of the terminal devices, and a serial data transmitting circuit 11 for returning current serial data as the response data.

In this embodiment, the following processing is performed in the case of usual disaster prevention supervisory processing:

The central control section 2 supplies calling data having a predetermined format to the serial data transmitting circuit 4 with a predetermined period. When the serial data receiving circuit 8 on the terminal device side receives time-series calling data, the serial data receiving circuit 8 extracts only the data superposed on a power source for the terminal devices and supplies the data to the transmitter control section 9. When it is decided by the transmitter control section 9 that the section 9 itself is specified by the calling data, the response data including the terminal state data detected by the sensor section 10 and the checksum data obtained by adding the terminal state data to self-address data is supplied on the serial data transmitting circuit 11 from the control section 9. The serial data transmitting circuit 11 converts the data into time-series current response data and returns the converted data to the transmission line L2. The response data is received by the serial data receiving circuit 5 through the switching circuit 7 on the side of the receiver 1. The serial data receiving circuit 5 performs current/voltage conversion and series/parallel conversion to form response data having portions of predetermined data bytes, each of which is then supplied to the central control section 2. The central control section 2 makes a decision by analysis of the response data whether or not an abnormality is present in the supervisory regions.

On the other hand, when error detection processing is performed for checking whether or not the terminal devices are respectively installed at normal positions, the following processing is executed:

The central control section 2 supplies calling data for instructing the error detection processing to the serial data transmitting circuit 4 with a predetermined period. The serial data transmitting circuit 4 converts the calling data into time series data and sends the data to the transmission line L1. When the transmitter control section 9 of the terminal device corresponding to the calling data decides that the self address of the section 9 is specified, the transmitter control section 9 supplies the error detection response data formed according to a predetermined format to the serial data transmitting circuit 11. The serial data transmitting circuit 11 converts the data into time-series current data and returns the data to the transmission line L2. The return current level check circuit 6 receives the error detection response data through the switching circuit 7 on the side of the receiver 1. When the results of predetermined error detection processing for the error detection response data are supplied to the central control section 2, the presence of an abnormality in the installation of the terminal devices is detected.

The switching circuit 7 is switched in accordance with the switching control signal output from the terminal C of the central control section 2. The return current check circuit 6 is operated in accordance with the control signal and the synchronizing signal which are respectively output from the terminals S, R of the central control section 2.

Further, the value of a steady-state current flowing through the transmission line is read before current level checking of the current level check circuit 6 of the returned current level check circuit 6, and a reference current value is set on the basis of this current value to check the level of a returned current.

If the line impedance varies with respect to terminals, different currents are returned from the terminals. In the present invention, however, the value of a current on the transmission line is read before address check data transmitted from the terminals is received, a reference current value is set on the basis of the read current value, and the current level of the address check data is monitored on the basis of the set reference current value. It is thereby possible to eliminate the influence of the impedance varying with respect to the transmission line length and systems.

The format of calling data sent for each period from the receiver 1 has 1-byte command data, 1-byte address data and 1-byte checksum data.

The command data serves as supervisory command data having a predetermined binary code in the disaster prevention supervisory mode in which each of the terminal devices is required for returning response data, for example, with respect to disaster prevention supervision. The address data is data having a binary code for specifying the address inherent to each of the terminal devices while being changed for each period. The checksum data is the sum (modulo 256) of the command data and the address data.

Figure 2:
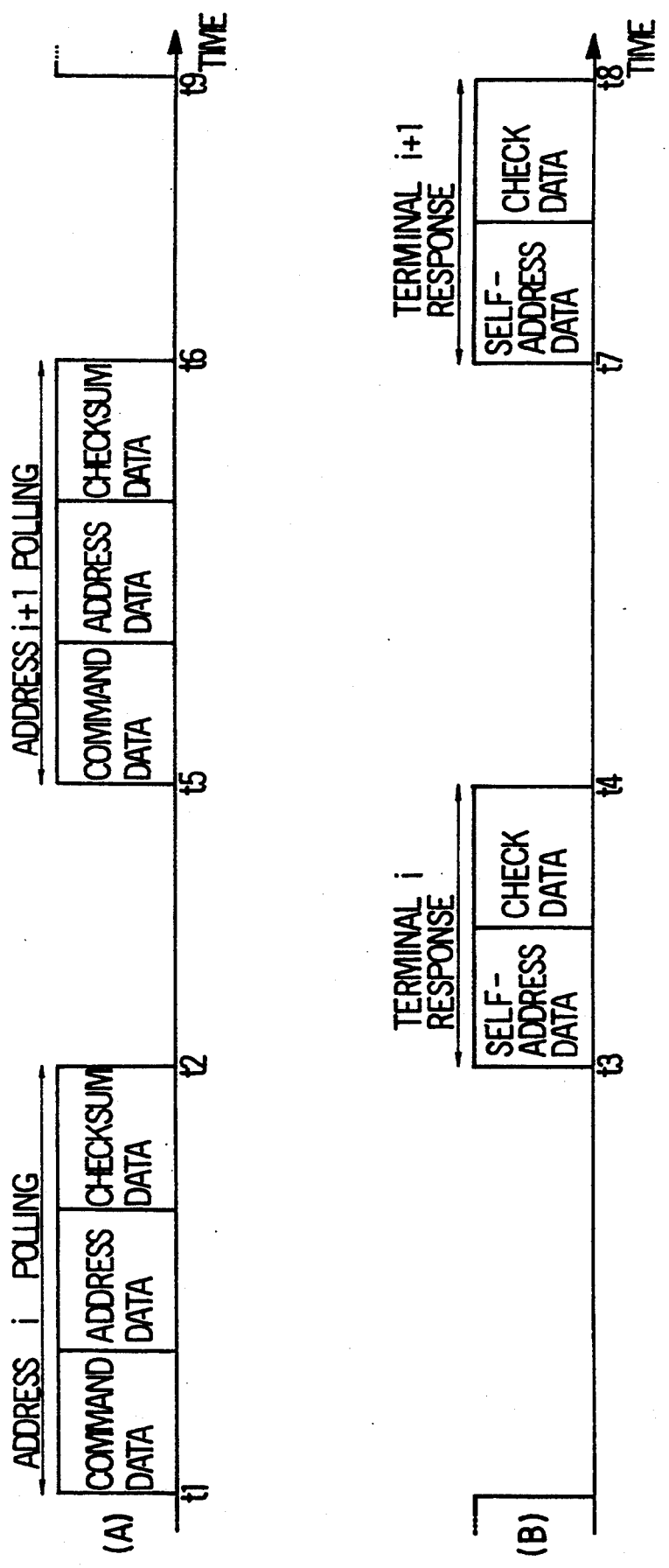
FIG. 2 is an explanatory view showing the format of timing of the calling data sent from a receiver and the error detection response data returned from a terminal device in an error detection mode.

While in the error detection mode for checking whether or not the terminal devices are respectively installed at predetermined positions with normal addresses, the command data shown in FIG. 2(A) has a predetermined data code for instructing the error detection processing. The address data is changed for each period so as to serve as data having a binary code for specifying the address inherent to each of the terminal devices, and the checksum data is the sum (modulo 256) of the command data and the address data.

Figure 12A:
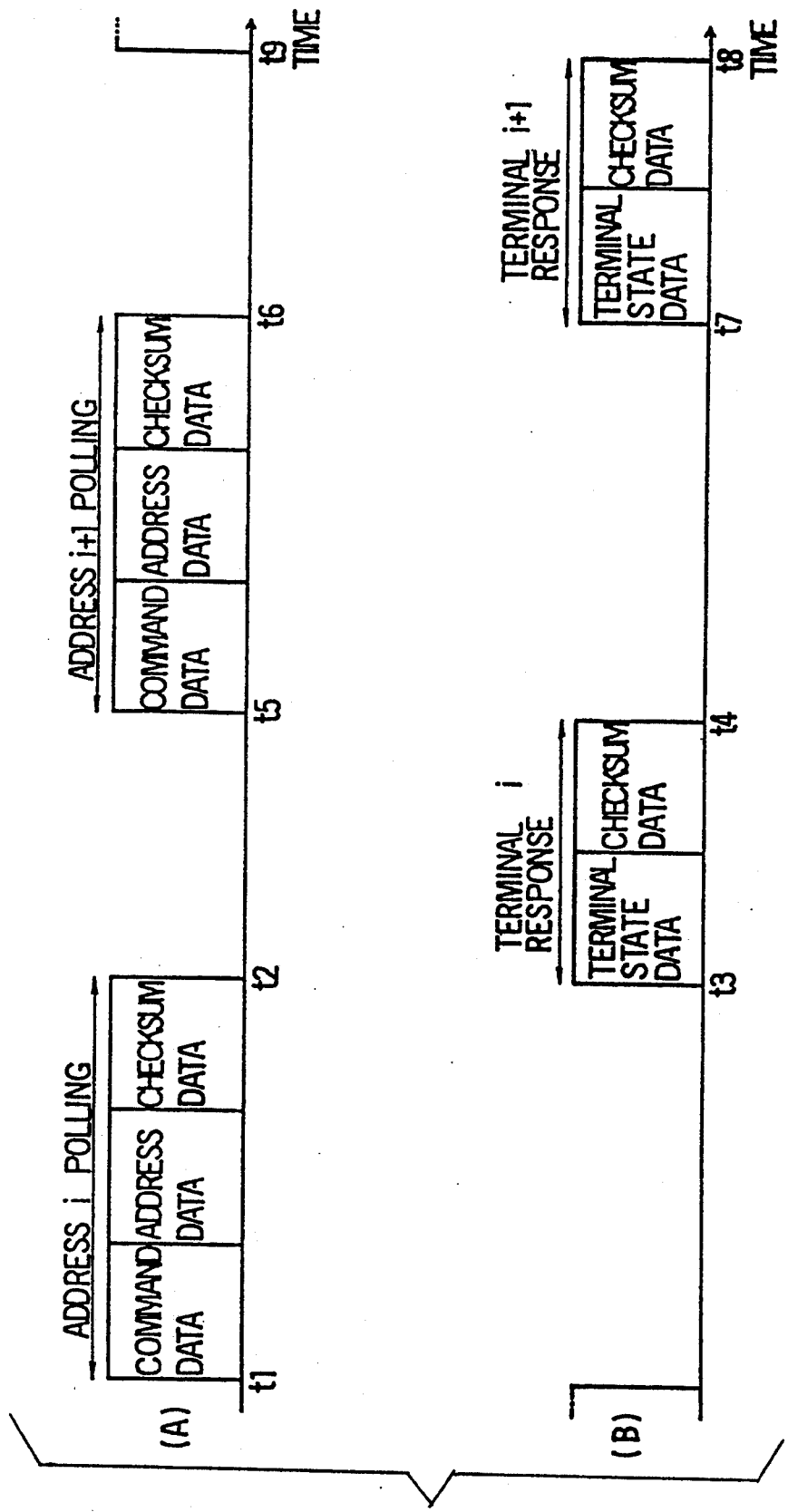
FIG. 12(A) is a schematic view showing one embodiment of a conventional transmission method.
Figure 12B:
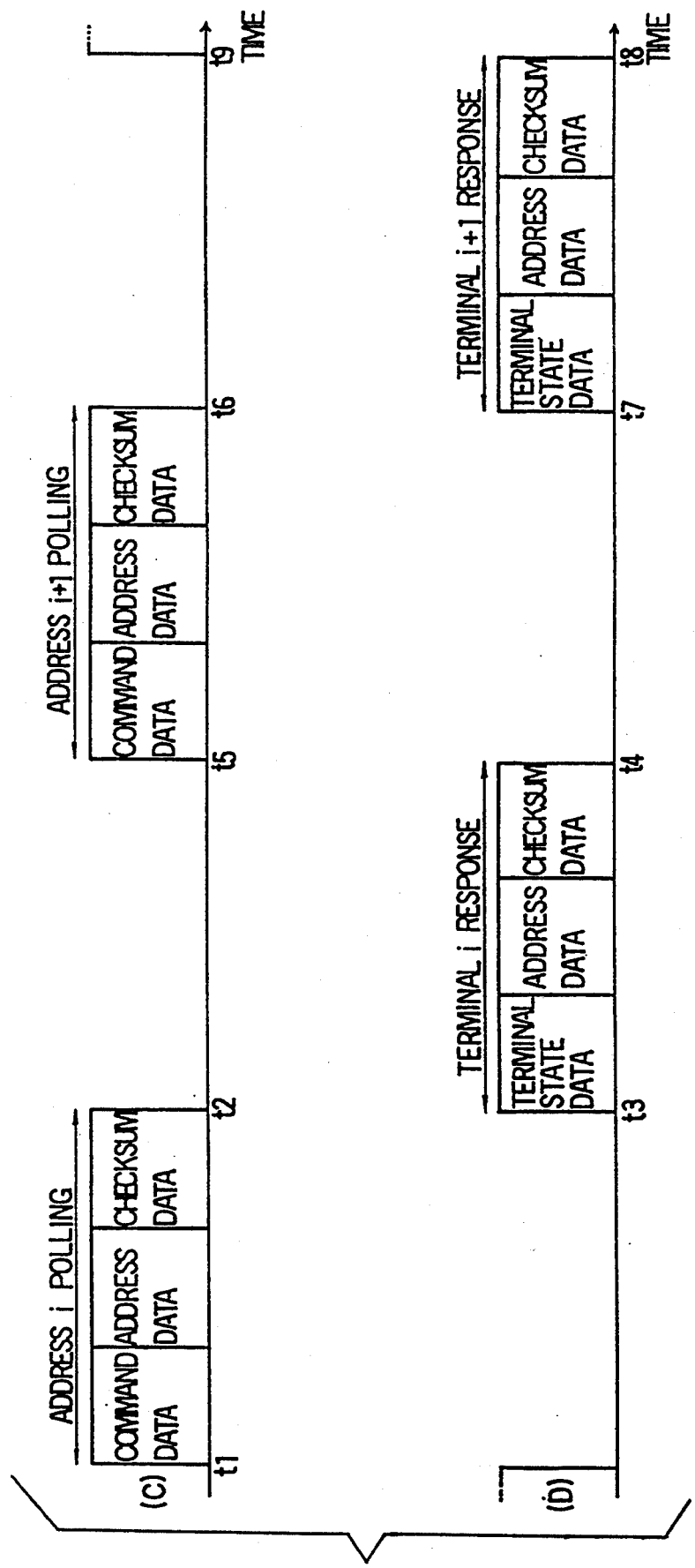
FIG. 12(B) is a schematic view of another embodiment of FIG. 12(A)

In the disaster prevention supervisory mode, the format of the response data returned from each of the terminal devices comprises 1-byte terminal state data and 1-byte checksum data, like the format shown in FIG. 12(B). The terminal specified by the address data in the calling data returns the response data. As described above, the checksum data in the response data is formed by adding the terminal state data to the self-address data of each of the terminal devices.

Figure 3:
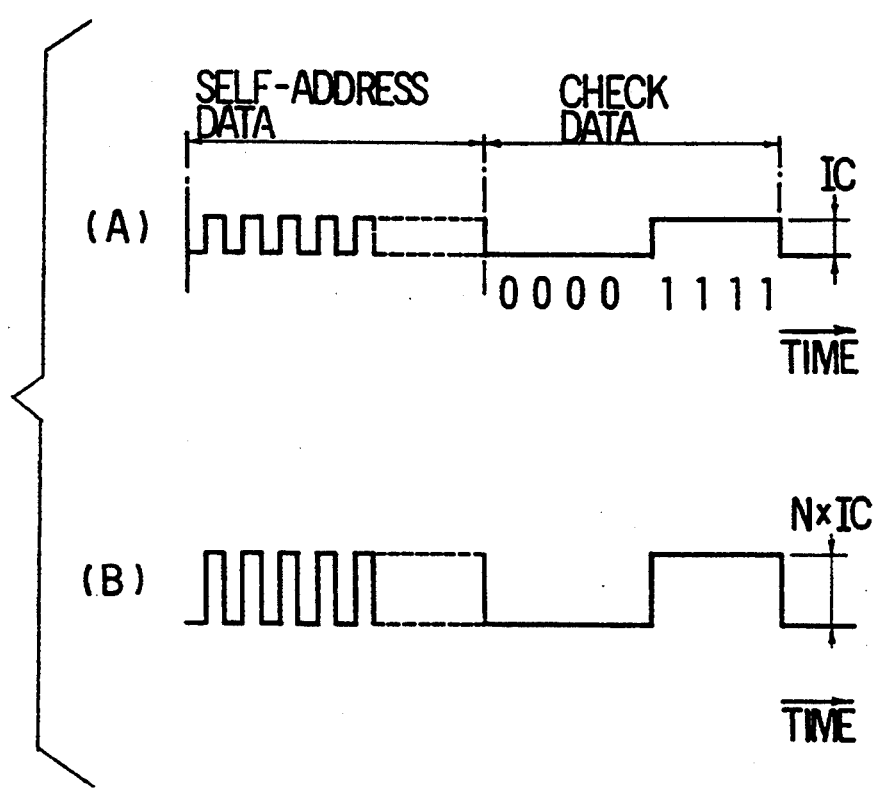
FIG. 3 is an explanatory view showing the details of the error detection response data returned from a terminal device.

While in the error detection mode, the format of the error detection response data comprises 1-byte self-address data showing self-address and subsequent 1-byte check data, as shown in FIG. 2(B). The check data has a front portion of 4 bits set at a theoretical value "0" and the remainder of 4 bits set at a theoretical value "1", as shown in FIG. 3(A)

In accordance with the present invention, the value of a steady-state current flowing through the transmission line is read before current level checking of the current level check circuit 6 of the returned current level check circuit 6, and a reference current value is set on the basis of this current value to check a returned current. This steady-state current value is read in the receiver 1 by one of the following two timings:

(1) The steady-state current is read at a time between the time when call data consisting of a confirmation command for designating an error detection, address data equal to address counter data, and a check sum is sent out to the transmission line by the receiver and the time when reply information is sent back from the terminals, i.e., at a time when there is no command signal from the receiver and no reply signal from the terminals on the transmission line.

(2) When check data of reply signals from the terminals is "0", where "0" is read as the steady-state current.

The operation of this embodiment is described below on the basis of the flow charts shown in FIGS. 4 to 10.

A description is first made of the case in which when the operator gives instructions for disaster supervision to the receiver 1, the central control section 2 controls in the disaster prevention supervisory mode.

In Step 100, an address counter is first set to the address of a terminal device to be specified by the central control section 2 of the receiver 1. If it is decided in Step 105 that the disaster prevention supervisory mode is instructed, in Step 110, polling processing is performed for the terminal device of the address set in the address counter.

Figure 5:
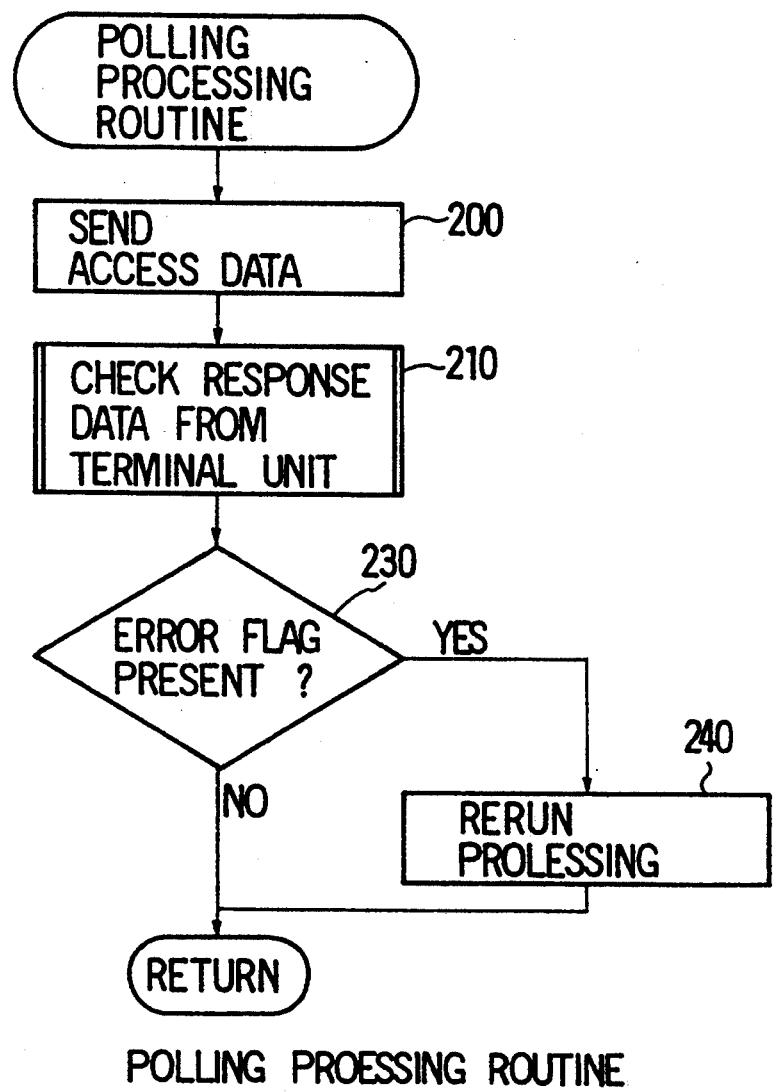
FIG. 5 is a flow chart showing the polling processing of a receiver in an embodiment.

In the polling processing, in Step 200, the receiver 1 sends the calling data including the command data, the address data set in the address counter and the checksum data through the transmission line L1, as shown in FIG. 5.

Figure 6:
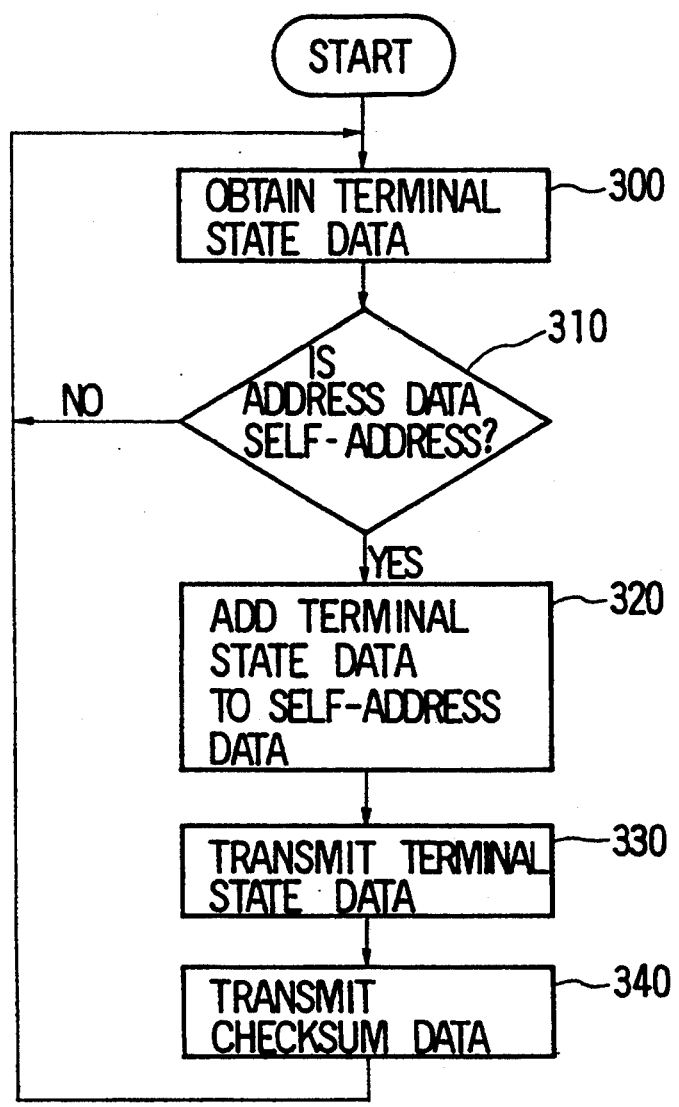
FIG. 6 is a flow chart showing the response processing of a terminal device in an embodiment.

On the other hand, each of the terminal devices under polling processing is operated in accordance with the flow chart shown in FIG. 6. The response data output from the terminals device which responds to the calling data is received by the receiver 1. As shown in FIG. 6, in Step 300, the transmitter control section 9 of each of the terminal devices obtains the terminal state data showing the conditions in the supervisory region detected by the sensor section 10. In Step 310, the transmitter control section 9 is in a stand-by state until the address data in the calling data agrees with the self address. When the address data in the calling data agrees with the self address, in Step 320, the transmitter control section 9 adds the terminal state data to the self-address data to form the checksum data. In Steps 330 and 340, the serial data transmitting circuit 11 then sends the response data to the transmission line L2 in the order of the terminal state data and the checksum data.

A description is made with reference to FIG. 5. In Step 210, when the response data returned in response to the calling data is received, error of the response data is checked.

Figure 7:
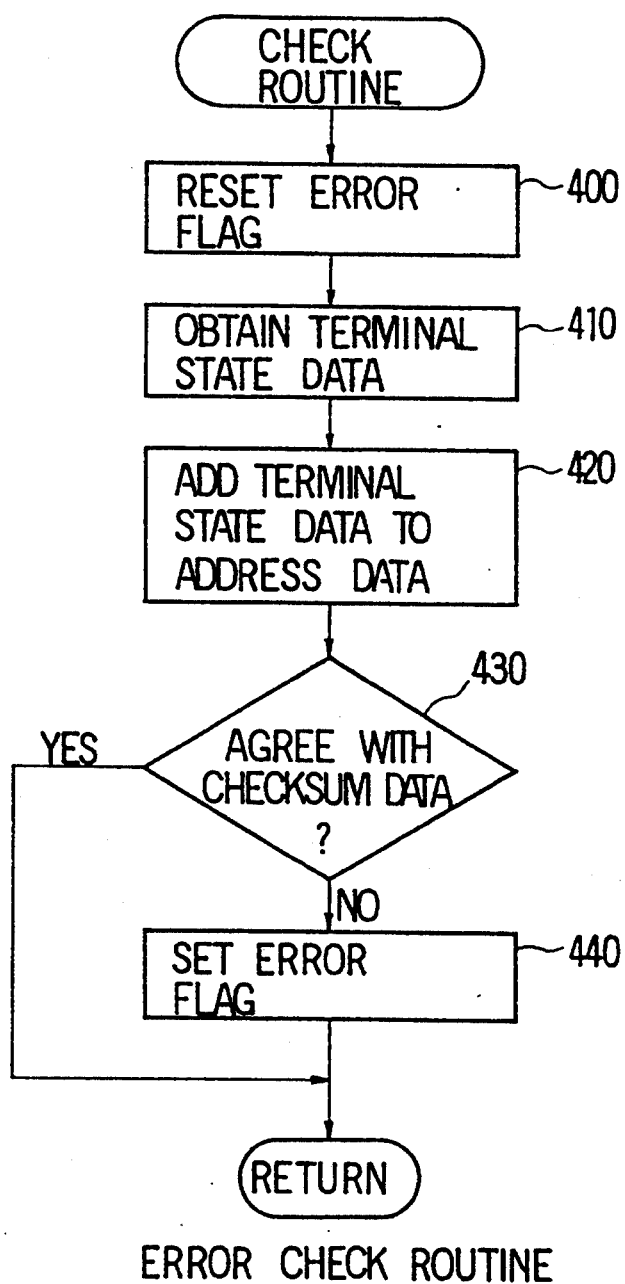
FIG. 7 is a flow chart showing the error check processing of a receiver in an embodiment.

The error is checked in accordance with the processing shown in FIG. 7. In FIG. 7, in Step 400, the response data error flag contained in the central control section 2 is reset, and in Step 410, the terminal state data of the response data is input to an operating section. In Step 420, the address data of the address counter is then added to the terminal state data. In Step 430, a decision is made as to whether or not the data determined by the addition agrees with the checksum data in the response data. If the data agrees with the checksum data, it is decided that no error is present in the response data. If the data does not agree with the checksum data, it is decided that error occurs, and in Step 440, the response data error flag is set. Only when error is detected, is the error flag set.

When the processing in the response data check routine is completed, the processing moves to Step 230 shown in FIG. 5. In Step 230, a decision is made as to whether or not the response data error flag is set. If the error flag is not set, the processing moves directly to Step 120 shown in FIG. 4. If the error flag is set, the rerun processing in Step 240 is performed, and the processing then moves to Step 120.

Figure 8:
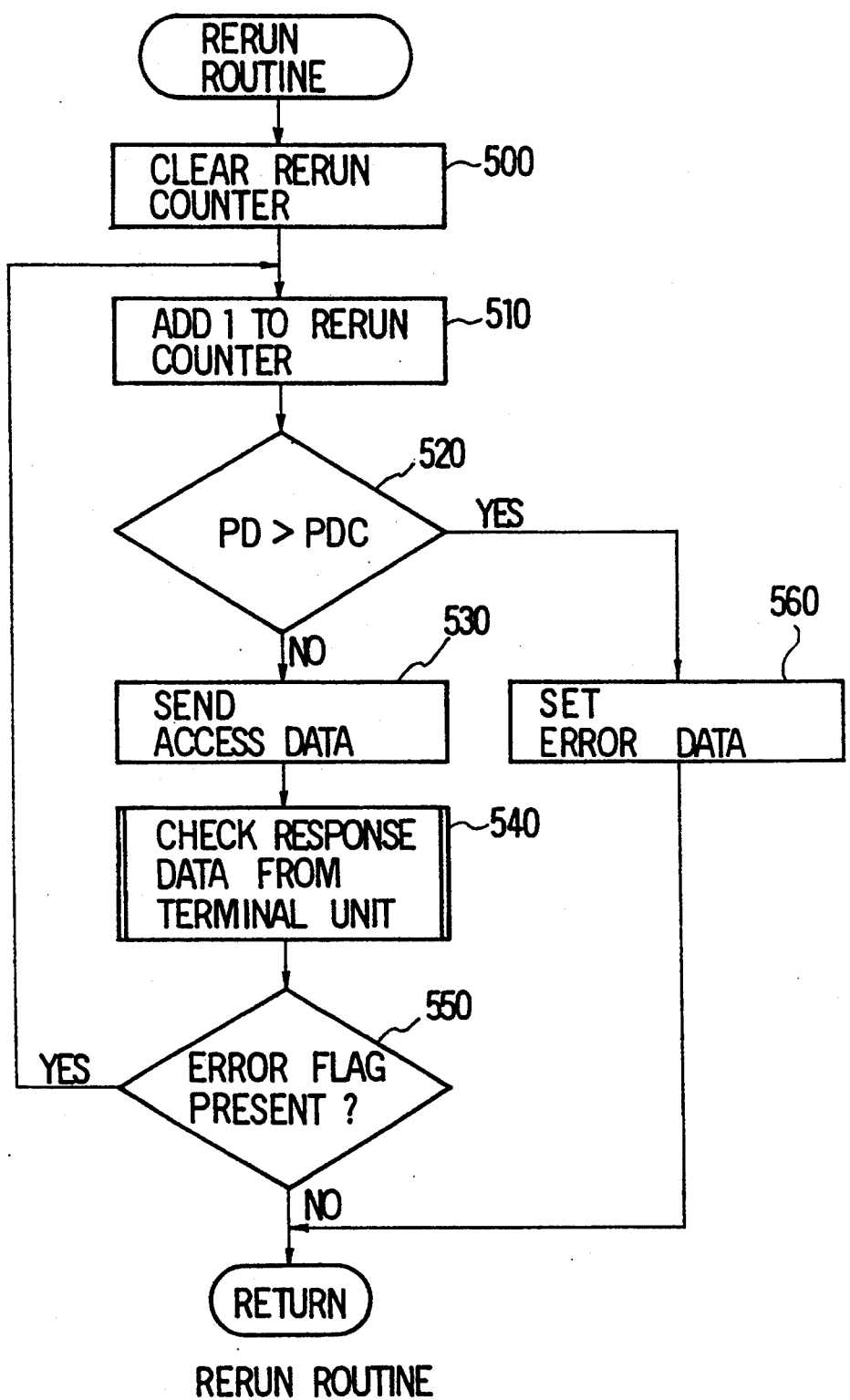
FIG. 8 is a flow chart showing the rerun processing of a receiver in an embodiment.

The rerun processing in Step 240 is performed in accordance with the rerun routine shown in FIG. 8.

In Step 500 shown in FIG. 8, the rerun counter in the central control section 2 is first cleared. In Step 510, 1 is then added to the data in the rerun counter. In Step 520, a decision is made as to whether or not the data value PD of the rerun counter exceeds a predetermined number PDC of reruns. If the data value PD does not exceed the predetermined rerun number PDC the processing moves to Step 530 in which calling data containing the same address data is sent to the side of the terminal devices through the transmission line L2. The response data from the terminal device which responds to the calling data is received in Step 540.

In Step 540, processing is performed in accordance with the same check routine as that shown in FIG. 7. If it is decided in Step 440 shown in FIG. 7 that the error flag is not set, the response data is normal. If the error flag is set, it is decided that error is again detected in the response data.

In Step 550, the presence of the error flag is detected. If the error flag is again set, the rerun processing from Step 510 to Step 550 is repeated until no error flag is detected in Step 550.

If it is decided in Step 520 that transmission error is not removed by repeating a predetermined number PDC of rerun processing, the processing moves to Step 560. In Step 560, display data showing the occurrence of transmission error is set, and the processing returns to the polling processing in Step 110 shown in FIG. 4.

Figure 4:
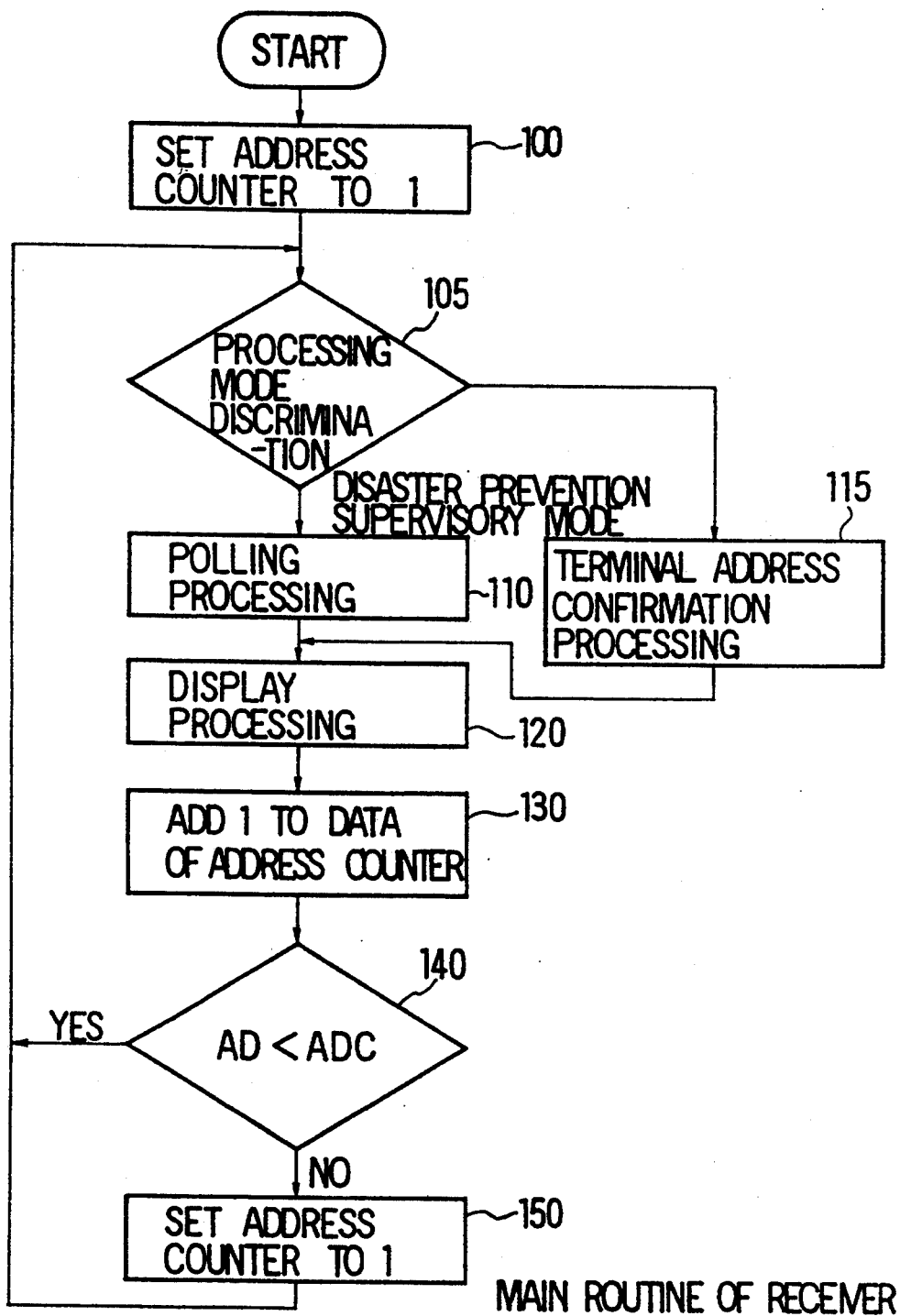
FIG. 4 is a flow chart showing the processing of a receiver in an embodiment.

In this way, when the polling processing in Step 110 shown in FIG. 4 is completed for one terminal device, in Step 120, the display section 3 displays the supervisory conditions of the supervisory region corresponding to the response data output from the terminal device and, if transmission error occurs, the display section 3 displays the error.

In Step 130, 1 is then added to the address counter for specifying the next terminal device. In Step 140, a decision is made as to whether or not the data value AD exceeds the final address ADC of the terminal devices. When the data value AD does not yet exceed the final address ADC, the processing from Step 105 to Step 140 is repeated for polling processing for the next terminal device. When it is decided in Step 140 that the data value AD exceeds the final address ADC of the terminal devices, the content of the address counter is reset to 1 in Step 150, and the processing from Step 105 to Step 140 is then repeated. This causes the polling processing to be performed again for the first terminal device.

In this way, in the usual disaster prevention supervisory mode the response data returned from each of the terminal devices includes the terminal state data and the checksum data obtained by adding the terminal state data to the self-address data. The address data is added to the terminal state data on the side of the receiver 1. In this case, when the data obtained by the addition does not agree with the checksum data, it is decided that transmission error occurs. It is therefore possible to securely detect the terminal device which produces transmission error. The length of the response data is short even if the data includes the self-address data. It is thus possible to perform the polling processing at a high speed.

A description is now to be made of the operation in the error detection mode.

When the operator gives instructions for error detection processing to the receiver 1, a decision is made in Step 105 shown in FIG. 4 as to whether or not the error detection mode is set, and the processing then moves to terminal address confirmation processing in Step 115.

Figure 9:
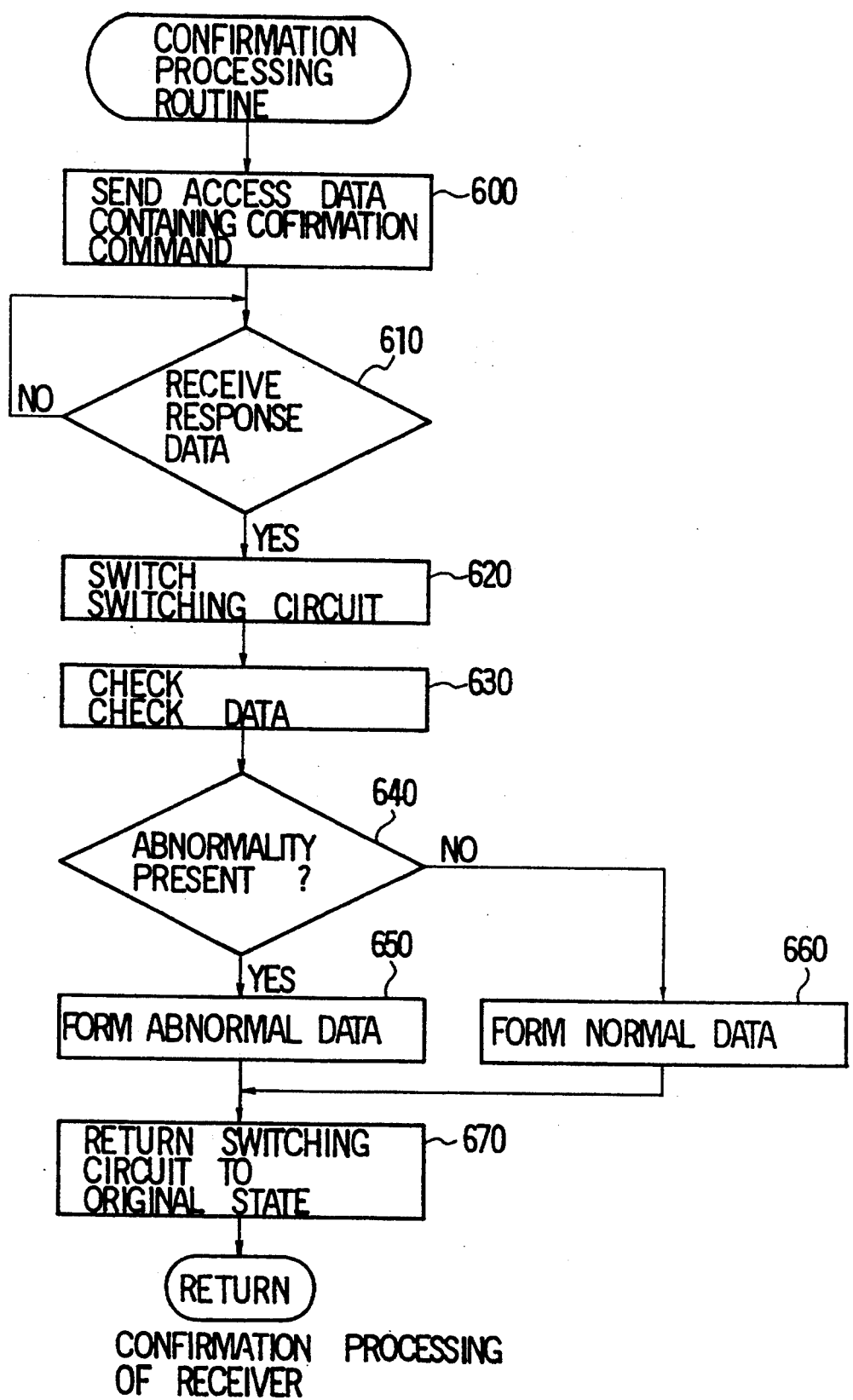
FIG. 9 is a flow chart showing the recognition processing by a receiver in an embodiment.
Figure 10:
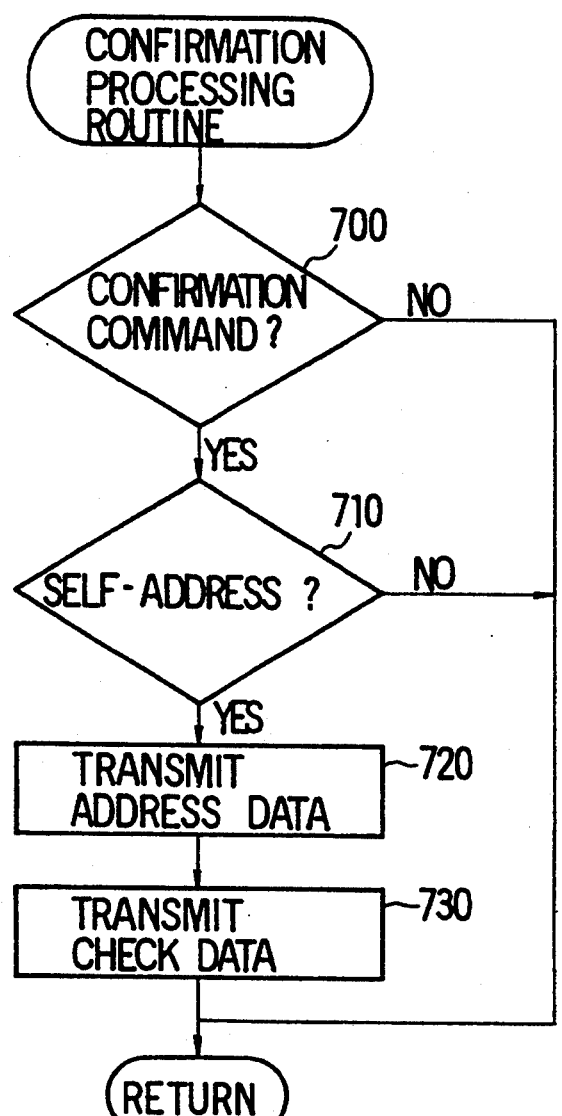
FIG. 10 is a flow chart showing the recognition processing by a terminal device in an embodiment.

The processing in Step 115 includes the processing shown in FIG. 9 performed on the side of the receiver 1 and the processing shown in FIG. 10 performed on the side of the terminal devices.

In Step 600 shown in FIG. 9, the receiver 1 first sends to the transmission line L1 calling data including recognition command for instructing error detection, the address data as the data of the address counter and checksum data.

A terminal device performs the response processing shown in FIG. 10 in response to the calling data. In Step 700 shown in FIG. 10, when the transmitter control section 9 decides that the recognition command data is set, in Step 710, a decision is made as to whether or not the address data agrees with the self address. If it is decided that the self address is specified, in Steps 720 and 730, the error detection response data including the self-address data and the checksum data is supplied to the serial data transmitting circuit 11 in response to the result of the decision. The serial data transmitting circuit 11 returns the error detection response data to the transmission line L2 after parallel/series conversion into time series current data.

On the other hand, the receiver 9 performs the processing in Step 610 shown in FIG. 9 and assumes a stand-by state until the error detection response data is returned. When it is recognized that the response data is received, in Step 620, the switching circuit 7 is switched so that the transmission line L2 is connected to the return current level check circuit 6.

In Step 630, the return current level check circuit 6 compares the current value IR of a portion at the theoretical value "1" in the check data with the internal reference current value IC with predetermined timing. In Step 640, the result of comparison is input to the central control section 2 which then decides whether or not an abnormality is present.

Namely, in a normal state without error, the error detection response data is received from only one terminal device. The current value IR is thus substantially equal to the current value IC of the check data shown in FIG. 3(A) sent from the terminal device side. At this time, it is decided that an abnormality is absent for the terminal device specified by the calling data sent from the side of the receiver 1.

On the other hand, when a plurality of terminal devices which are set to the same address simultaneously respond to the calling data and return the error detection response data, for example, as shown in FIG. 3(B), the current value IR of a portion at the theoretical value "1" in the check data is a value of N×IC which is proportional to the number N of the terminal devices which simultaneously respond. Since the relation, IR>IC, is thus established, it is decided that an abnormality is present.

When it is decided that an abnormality is present, the processing moves to Step 650. In this case, abnormal data for indicating the presence of an abnormality for the addressed terminal device is formed.

The above-mentioned internal reference current value IC is set on the basis of the value of a steady-state current flowing through the transmission line. This value is read before current level checking of the returned current level check circuit 6 of the receiver 1. Specifically, it is set by one of the following two methods:

(1) The steady-state current is read at a time between the time when call data consisting of a confirmation command for designating an error detection, address data equal to address counter data, and a check sum is sent out to the transmission line by the receiver and the time when reply information is sent back from the terminals, i.e., at a time when there are no command signals from the receiver and no reply signal from the terminals on the transmission line, and the reference current value IC is set on the basis of this constant current value.

(2) When check data of reply signals from the terminals is "0", "0" is read as the steady-state current, and the reference current value IC is set on the basis of this constant current value.

To set the reference current value IC on the basis of the constant current value, a suitable method, e.g., a method of multiplying the constant current value by a predetermined coefficient, may be adopted.

When it is decided that no abnormality is present, in Step 660, normal data for indicating the absence of an abnormality for the addressed terminal device is formed. In Step 670, the switching circuit 7 is then switched so that the serial data transmitting circuit 5 is connected to the transmission line L2, and the processing in Step 115 shown in FIG. 4 is completed.

The abnormal data or the normal data formed in Step 650 or 660 is displayed on the display section 3 in Step 120.

In Step 140, the address counter is then set to the address of the next terminal device to be called. If the address of the terminal device to be called is not the final address, the processing is repeated from Step 105 through the processing in Steps 140 and 150.

In this way, as shown in FIGS. 3(A) and 3(B), in the error detection mode, each terminal device returns the error detection response data having a predetermined format, and the current value of a portion corresponding to the check data in the error detection response data is detected on the side of the receiver 1. A decision is then made as to whether or not each of the terminal devices is set to a predetermined address. It is thus possible to securely rapidly detect an abnormality.

In addition, the check data in the error detection response data comprises a low-frequency square signal having the portions each respectively set at the theoretical values "0" and "1", as shown in FIG. 3(A) The return current level check circuit 6 is thus capable of reliable strobing in synchronism with the portion set at the theoretical value of "1". It is therefore possible to improve the degree of freedom of design and the reliability of data transmission.

Figure 11:
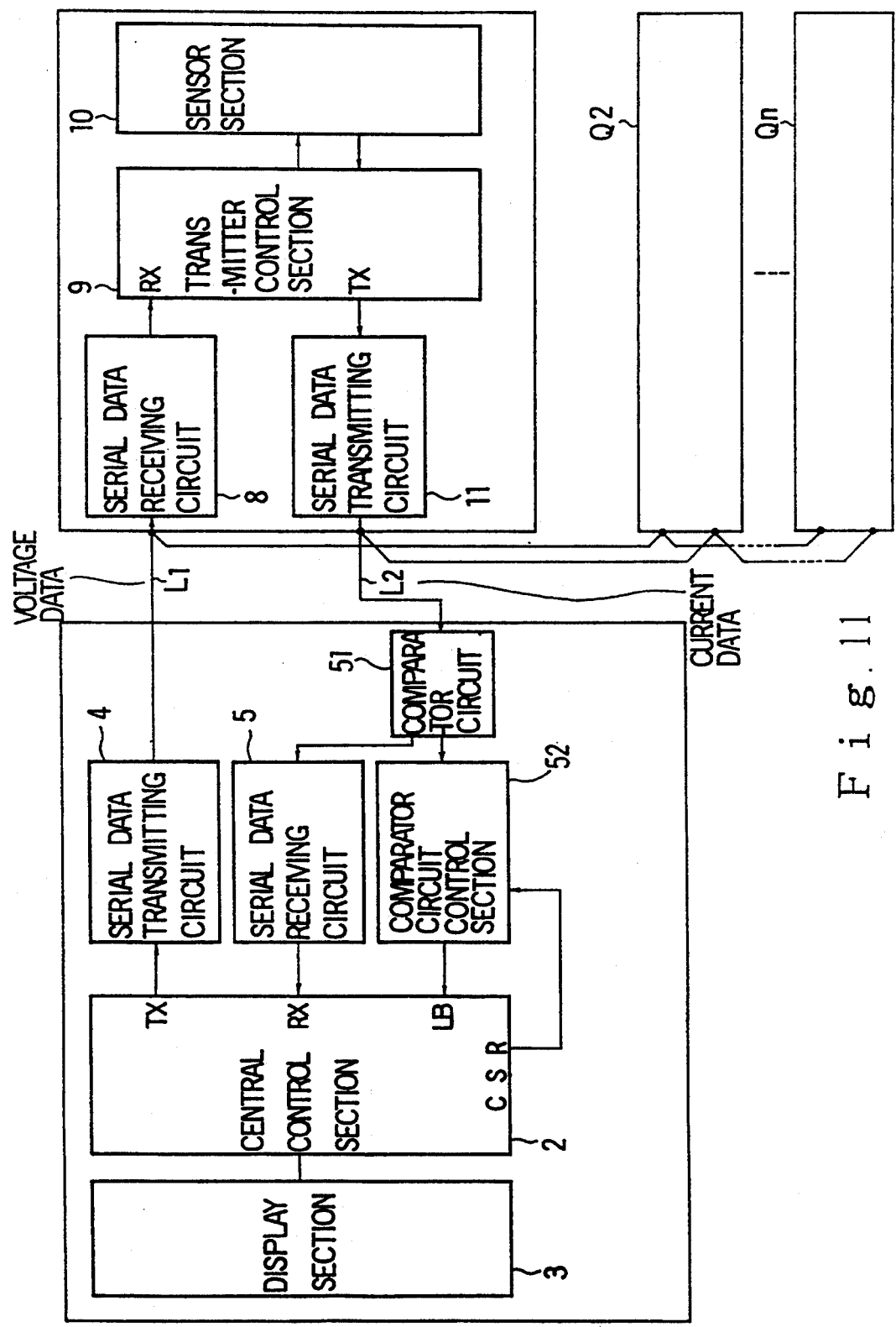
FIG. 11 is an explanatory view showing the configuration of a second embodiment of the present invention.

A second embodiment of the present invention is described below. In the second embodiment, the configuration of the receiver in the first embodiment is simplified, as shown in FIG. 11.

In this embodiment, a receiver 1 comprises a central control section 2 containing a microprocessor for forming calling data and analyzing response data, a display section 3 for displaying supervisory conditions and the like, a serial data transmitting circuit 4 for serially transmitting the calling data, a serial data receiving circuit 5 for receiving the response data returned from each of terminal devices, a comparator circuit 51 for comparing the current value of the response data sent from each of the terminal devices with a predetermined threshold value previously set and a comparator circuit control section 52 for controlling the comparator circuit 51.

In the comparator circuit 51 two threshold value are previously set, for example, 9 mA and 30 mA. The comparator circuit control section 52 selects and sets one of the two threshold values according to the instructions from the central control section 2. The comparator circuit 51 sends the current only higher than the set threshold value to the serial data receiving circuit 5.

In this embodiment, in usual disaster prevention supervisory processing, the comparator circuit control section 52 sets the threshold value of 9 mA among the above examples of threshold values. The threshold value is set in the comparator circuit 51 even in usual processing in order to remove effects of the noise component contained in the return data. Since usual return data is returned with a current of about 20 mA, the return data is thus supplied to the central control section 2 without being damaged even if the noise component is removed.

On the other hand, in the case of error detection processing, the comparator circuit control section 52 sets as a threshold value 39 mA which is the sum of 9 mA and 30 mA. Data only having a current value higher than 39 mA is thus supplied to the central control section 2. Since the return data is returned with a current of 20 mA from each of the terminal devices, when only one terminal device responds, the current is cut by the comparator circuit 51 and is not supplied to the central control section 2. However, when two or more terminal devices respond, since the current of the return data is 40 mA or more which is higher than the threshold value of 39 mA, the data is supplied to the central control section 2. When the return data is supplied to the central control section 2 after the calling data is sent, it is decided that an abnormality is present.

The present invention configured as described above enables reliable detection of error and simplification of the structure of the receiver.

In the above embodiment, two threshold values are set previously, such as 9 mA and 39 mA, and the data with less than 9 mA is cut as a noise component, while in the case of the data with more than 39 mA it is decided that an abnormality is present. However, it is possible to set the range, such as 9-39 mA to decide an abnormality. It is decided that a normality is present when said range data is received and that an abnormality is present when the data is higher than the range.

Figure 13:
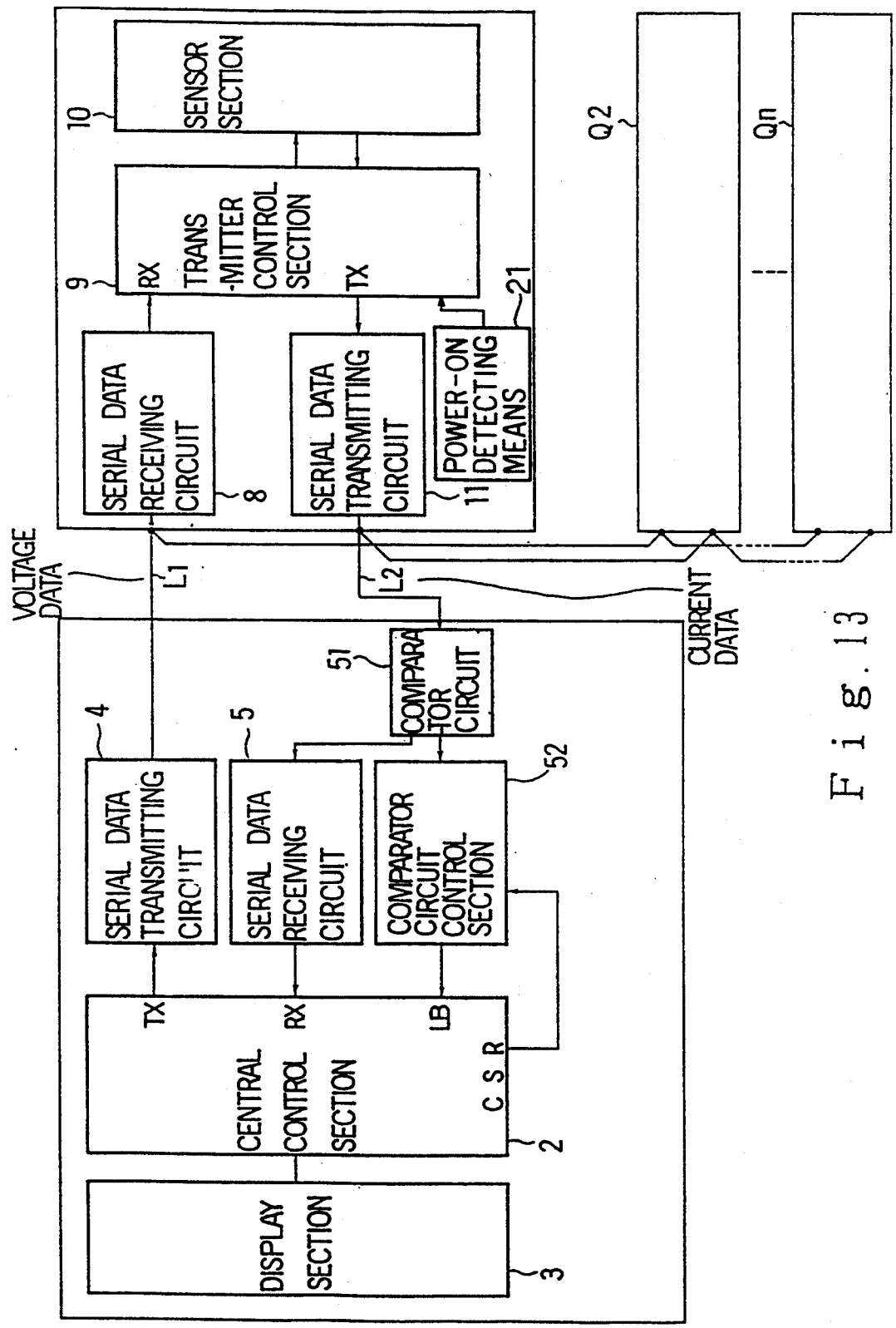
FIG. 13 is an explanatory view showing the configuration of a third embodiment of the present invention.

Next, a third embodiment of the present invention will be described. The third embodiment is arranged in such a manner that, as shown in FIG. 13, power-on detection means 21 is provided in each terminal of the second embodiment to automatically perform address overlap checking when the terminal is substituted.

A terminal Q10 of this embodiment is the same as terminal Q1 of the second embodiment except that power-on detection means 21 is provided.

The power-on detection circuit 21 sets power-on flag data by detecting a state in which its power source is turned on.

The receiver 1 sets an address overlap check mode to perform the operation of detecting an address overlap if power-on flag data is set in reply information from the terminal Q1 after the power source has been turned on. This address overlap checking may be performed with respect to terminals having addresses with set flag information or may be performed with respect to all terminals.

In the thus-arranged third embodiment, when the terminal interchange operation is performed, the receiver sets the address overlap check mode on the basis of the detection of power-on data from the substituted terminal to perform address checking. It is therefore possible to detect an address setting error, if any, and to adopt suitable measures. The system reliability can be compensated thereby.

The operation of the third embodiment will be described with reference to FIGS. 14 and 15.

Figure 14:
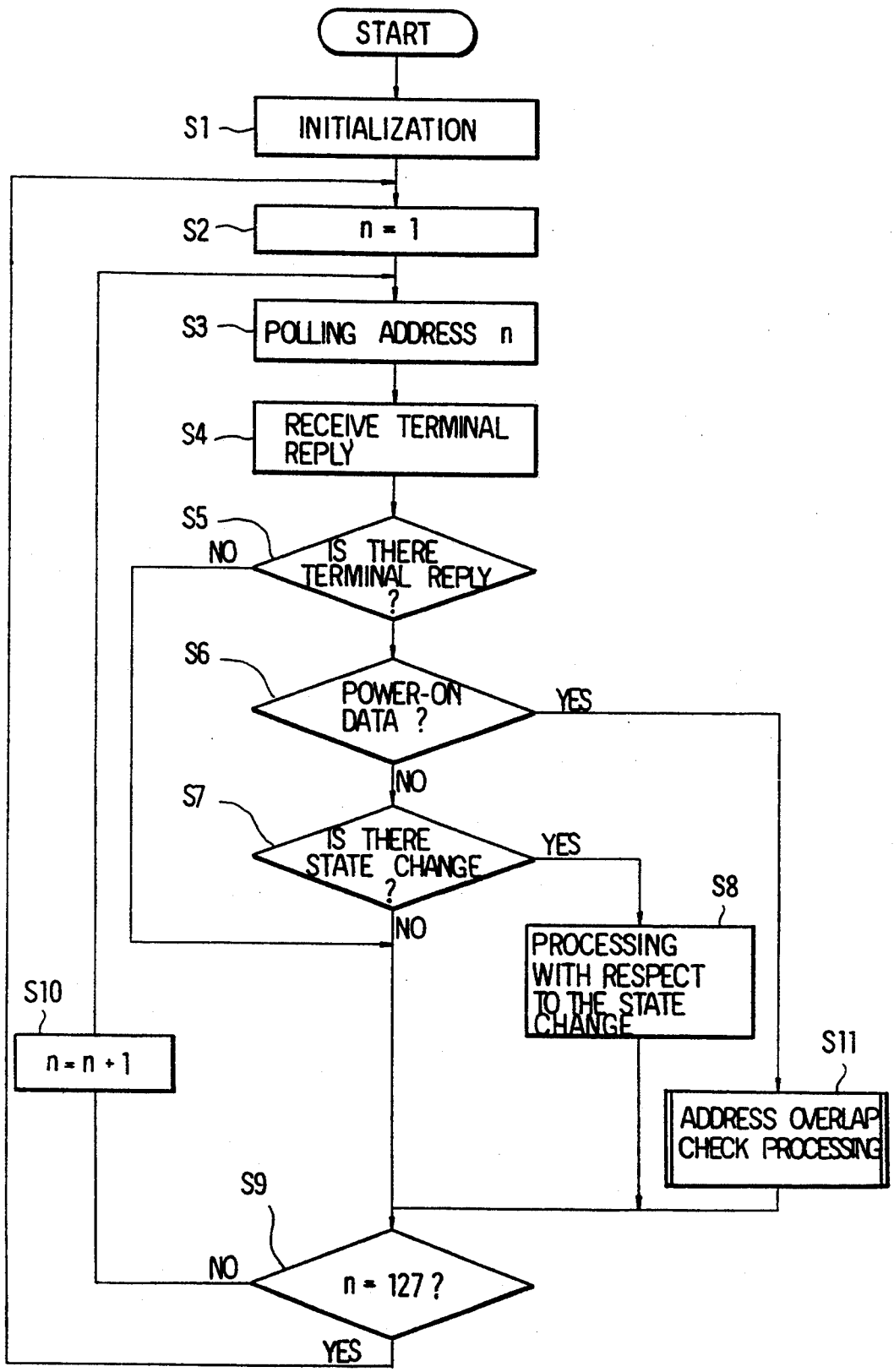
FIG. 14 is a flow chart showing the processing of a receiver in the third embodiment.

FIG. 14 is a flow chart of the processing operation of the illustrated receiver. In the process shown in FIG. 14, when the power source of the receiver 1 is turned on, predetermined initialization is performed in step S1, and a terminal address n is set to n=1 in step S2. Next, in step S3, terminal polling is performed at address n. In step S4, a terminal reply to the polling is received.

In step S5, the existence/non-existence of a terminal reply is checked. If there is a terminal reply, the reply is checked in step S6 as to whether or not it is power-on data. In the ordinary monitoring state, it is not power-on data, and the process proceeds to step S7 to check terminal reply data to determine whether there is a state change in the terminal reply data. If there is a state change, the process proceeds to step S8 to execute processing with respect to the state change. This state change corresponds to a fire detection signal or a signal designating a terminal functional failure.

On the other hand, if terminal interchange is performed, power-on data is set back as a terminal reply to terminal polling. In this case, the process proceeds from step S6 to step S11 to execute address overlap check processing.

This address overlap checking is performed by the same method as that in the first and second embodiments.

Figure 15:
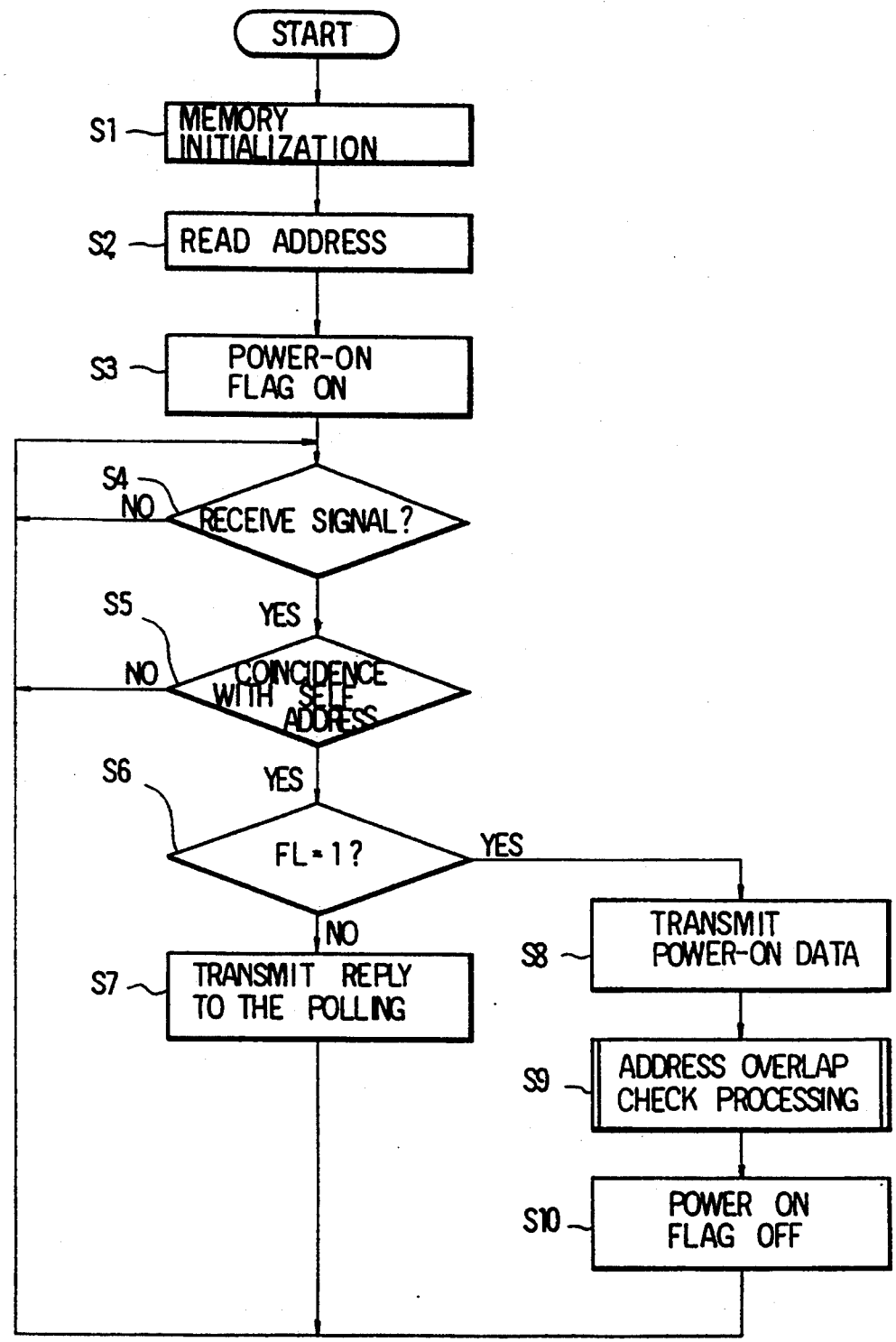
FIG. 15 is a flow chart in the process of a terminal side in the third embodiment.

FIG. 15 is a flow chart of the processing operation on the terminal side. In the process shown in FIG. 15, when the terminal power source is turned on, the memory is initialized in step S1, and a terminal address previously set is read in step S2. Further, in step S3, power-on flag FL is set to FL=1 by the function of the power-on detection means.

In step S4, the existence/non-existence of a signal received by polling from the receiver is checked. If a signal is received, a determination is made in step S5 as to coincidence with the terminal's address. If address coincidence is recognized, power-on flag FL is checked in step S6. At the time of initial calling immediately after the operation of turning on the power source, since power-on flag FL =1 is set, the process proceeds to step S8 to transmit power-on data to the receiver.

In response to the power-on data transmitted from the terminal, the receiver sends back an address overlap check processing command as shown in step S11 of FIG. 14. On the basis of this command, data transmission for address overlap checking is performed in step S9 on the terminal side. When the sequence of processing is completed, power-on flag FL is set to FL =0 in step S10, and the process returns to step S4.

Since power on-flag FL is FL=0 with respect to subsequent polling from the receiver in the steady state, the process proceeds from step S6 to step S7 to transmit a reply to the polling.

What is claimed is:

1. A disaster prevention observation system comprising: a receiver and a plurality of terminals connected to said receiver through a transmission line, each terminal receiving a call signal designating its own address from said receiver, each terminal returning terminal information in response to the call signal, each of said terminals having:
   power-on detection means for setting flag information by detecting a state in which terminal power supply is turned on; and
   a transmission control section for transmitting the power-on information when the call signal designating the terminal's address is received from said receiver after power supply turning-on, and for returning reply data for address overlap detection including the terminal's address and check data of a prescribed current level when an address overlap detection command designating the terminal's address is received from said receiver, said receiver having:

control means for setting an address overlap check mode and sending an address overlap check command to each terminal when power-on information is received from the terminal; and determination means for determining an address overlap when the current level of the check data in the reply data for address overlap detection returned from the terminal exceeds a previously-set reference current level by comparing the current level of the check data and the reference current level, address overlap checking of each terminal being performed when the power supply for the terminal is turned on.

2. A disaster prevention observation system according to claim 1, wherein said receiver comprises setting means for reading the value of a steady-state current on the transmission line before reply data for address overlap detection is received from said terminals, and for setting the reference current level on the basis of the read current value.

3. A disaster prevention observation system according to claim 1, wherein said receiver comprises a returned current level comparison circuit for comparing the current level of the check data in the reply data for address overlap detection returned from the terminal and the reference current level set by said setting means, and for producing an output when the current level of the check data exceeds the reference current level; and determination means for determining an address overlap on the basis of the output from said comparison circuit.

4. A disaster prevention observation system according to claim 1, further comprising a serial data receiving circuit for receiving ordinary data returned from each terminal, a changeover circuit for changing the returned current level checking circuit and the serial data receiving circuit to receive data returned from the terminal, and a central control section for controlling the changeover circuit.

5. A disaster prevention observation system according to claim 2, wherein said receiver comprises a returned current level comparison circuit for comparing the current level of the check data in the reply data for address overlap detection returned from the terminal and the reference current level set by said setting means, and for producing an output when the current level of the check data exceeds the reference current level; and determination means for determining an address overlap on the basis of the output from said comparison circuit.

6. A disaster prevention observation system according to claim 2, further comprising a serial data receiving circuit for receiving ordinary data returned from each terminal, a changeover circuit for changing the returned current level checking circuit and the serial data receiving circuit to receive data returned from the terminal, and a central control section for controlling the changeover circuit.

* * * * *